US008579251B2

(12) United States Patent
Ambrosi et al.

(10) Patent No.: US 8,579,251 B2
(45) Date of Patent: Nov. 12, 2013

(54) SOLENOID VALVE

(75) Inventors: Massimiliano Ambrosi, Marbach (DE); Nicolas Houis, Bietigheim-Bissingen (DE); Gerhard Schuster, Freiberg (DE); Siegfried Huber, Heilbronn (DE); Gerhard Stokmaier, Markgroeningen (DE); Ingo Buchenau, Steinheim (DE); Michael Hilden, Obersulm-Eschenau (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 12/998,342

(22) PCT Filed: Sep. 14, 2009

(86) PCT No.: PCT/EP2009/061868
§ 371 (c)(1),
(2), (4) Date: Apr. 11, 2011

(87) PCT Pub. No.: WO2010/040620
PCT Pub. Date: Apr. 15, 2010

(65) Prior Publication Data
US 2011/0198522 A1  Aug. 18, 2011

(30) Foreign Application Priority Data
Oct. 10, 2008 (DE) .......................... 10 2008 042 731

(51) Int. Cl.
*F16K 31/02* (2006.01)
*F16K 15/00* (2006.01)
*F16K 17/00* (2006.01)
*F16K 21/04* (2006.01)
*E03B 1/00* (2006.01)
*F15B 13/02* (2006.01)

(52) U.S. Cl.
USPC ................................ 251/129.02; 137/601.21

(58) Field of Classification Search
USPC ........... 251/30.01, 129.02, 30.02; 137/601.21
See application file for complete search history.

(56) References Cited

U.S. PATENT DOCUMENTS 5,476,243 A * 12/1995 Oehler et al. .................... 251/24
5,649,748 A *  7/1997 Oehler et al. .............. 303/119.2
(Continued)

FOREIGN PATENT DOCUMENTS

| CN | 1081744 C | 3/2002 |
|---|---|---|
| DE | 44 45 221 A1 | 6/1996 |
| DE | 102 08 996 A1 | 9/2003 |
| DE | 10253769 A1 | 6/2004 |
| DE | 102004028871 A1 | 1/2006 |
| DE | 102006002638 A1 | 7/2007 |
| DE | 10 2007 053 134 A1 | 5/2009 |
| EP | 0418502 A2 | 3/1991 |
| JP | 7-190231 A | 7/1995 |

*Primary Examiner* — John K Fristoe, Jr.
*Assistant Examiner* — Frederick D Soski
(74) *Attorney, Agent, or Firm* — Maginot, Moore & Beck

(57) ABSTRACT

The invention relates to a solenoid valve, particularly for controlling the brake pressure of a wheel brake of a slip-controllable hydraulic brake system of a motor vehicle. In known solenoid valves, there is a first hydraulically effective connection of an armature chamber of the solenoid valve to an outlet through the guide of a tappet in a valve insert. The first hydraulically effective connection ends in the form of a blind hole and thus does not permit flushing out gas bubbles which possibly have accumulated in the armature chamber. In order to solve this problem, the invention proposes a second hydraulically effective connection which is arranged away from the guide of the tappet, uncoupled from the first hydraulically effective connection. Thus, a closed pressure medium path is effected within a valve cartridge of the solenoid valve, the closed pressure medium path making possible an effective flushing of the armature chamber and thus a flushing out of gas bubbles.

20 Claims, 1 Drawing Sheet

(56) References Cited

U.S. PATENT DOCUMENTS

| | | | |
|---|---|---|---|
| 5,725,289 A * | 3/1998 | Mueller et al. | 303/119.2 |
| 5,836,334 A * | 11/1998 | Mittwollen et al. | 137/1 |
| 5,964,578 A * | 10/1999 | Suitou et al. | 417/222.2 |
| 5,975,654 A * | 11/1999 | Zaviska et al. | 303/119.2 |
| 6,065,495 A * | 5/2000 | Fong et al. | 137/625.25 |
| 6,224,348 B1 * | 5/2001 | Fukanuma et al. | 417/222.2 |
| 6,439,265 B1 * | 8/2002 | Gruschwitz et al. | 137/601.14 |
| 6,644,623 B1 * | 11/2003 | Voss et al. | 251/129.15 |
| 7,575,218 B2 * | 8/2009 | Speer et al. | 251/129.02 |
| 2003/0183790 A1 * | 10/2003 | Ji et al. | 251/129.02 |
| 2003/0201417 A1 * | 10/2003 | Ahn | 251/129.02 |
| 2007/0102659 A1 * | 5/2007 | Schrade | 251/129.02 |

* cited by examiner

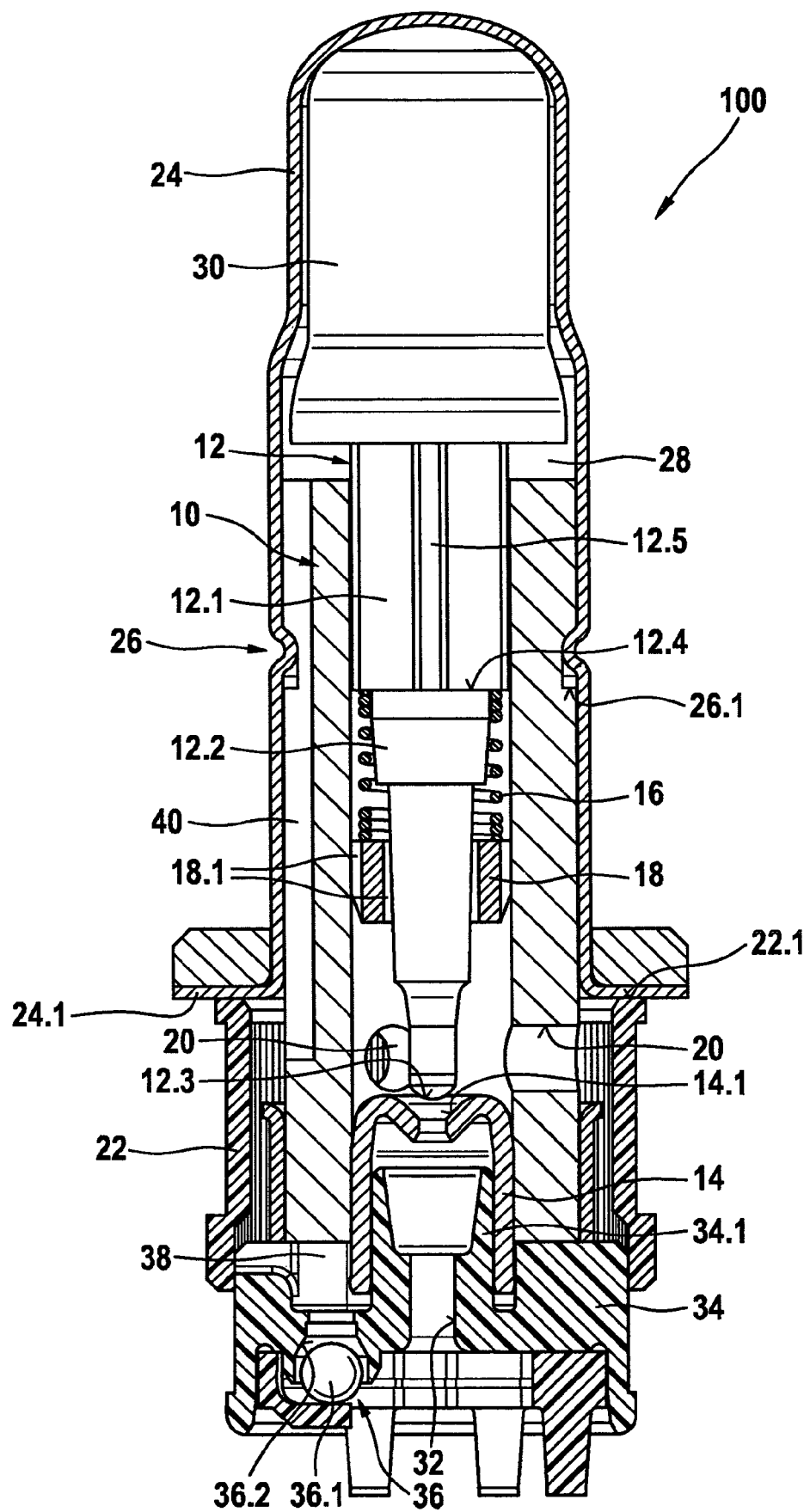

SOLENOID VALVE

CROSS-REFERENCE TO RELATED APPLICATION

This application is a 35 USC 371 application of PCT/EP 2009/061868 filed on Sep. 14, 2009.

BACKGROUND OF THE INVENTION

1. Field of the Invention

The invention relates to a solenoid valve, in particular for controlling the brake pressure in a wheel brake of a slip-controllable hydraulic brake system of a motor vehicle.

2. Description of the Prior Art

Solenoid valves of this kind are already known, for example, from the applicant's prior patent application with the filing number DE 10 2007 053 134.8.

In the following, slip-controllable hydraulic brake systems of motor vehicles are understood to be antilock brake systems (ABS), traction control systems (TCS), or electronic stability program systems (ESP). In these control systems, it is possible to use solenoid valves to control or regulate the brake pressure of at least one wheel brake, e.g. as a function of the slip ratios occurring in the respective wheel. These solenoid valves are triggered by means of an electronic control unit that evaluates sensor signals to accomplish this.

The solenoid valves used in these control systems are of two basic known types: either solenoid valves are used, which are embodied in the form of switching valves that can be switched into two discrete positions (starting position and switched position) or are embodied in the form of continuous control valves (=proportional valves) that can assume any of a multitude of intermediate positions between an open position and a closed position. The invention can be used equally with switching valves and continuous control valves.

Among other essential components, the solenoid valves described in DE 10 2007 053 134.8 have a valve insert in which at least one inlet and one outlet, respectively, are embodied. For cost reasons, the valve insert is manufactured by being rolled from a sheet metal strip, the two ends of which rest against each other virtually without gaps. The reason for this is that the presence of a possible gap would constitute an undesirable obstacle within the magnetic circuit of the solenoid valve and should therefore be avoided.

To control a hydraulic connection between the inlet and outlet, a valve element is provided, which constitutes a control cross-section. In the above-cited prior art, the control cross-section is embodied in the form of a valve seat. This valve seat can be controlled by means of a tappet that is accommodated for this purpose in sliding fashion in the valve insert. The tappet is actuated indirectly by means of an armature that is movably accommodated in an armature chamber. The armature chamber is delimited by a capsule that is closed at one end and is affixed to the valve insert.

A valve insert equipped with a capsule; an armature, a tappet, and a valve element constitutes a so-called valve cartridge. An annularly embodied, electronically triggerable coil is slid onto this valve cartridge. When this coil is triggered, the armature is subjected to magnetic forces that act in the closing direction of the solenoid valve. These closing forces act in opposition to hydraulic forces and mechanical spring forces, which load the armature in an opening direction, toward a starting position. As soon as the magnetic forces exceed these opening forces, the armature executes a working stroke. The armature movement is transmitted to the tappet, which therefore closes the valve seat. When the electrical triggering of the coil ceases, the spring force moves the tappet back and the solenoid valve once again assumes its open, through-flow position.

Under operating conditions, the interior of a solenoid valve designed in this way is completely filled with pressure fluid to be controlled. However, gas (air) can be dissolved in this pressure fluid. Under certain operating conditions, this gas can outgas from the pressure fluid and form gas bubbles. These tend to collect in the armature chamber. Particularly with continuous control valves, gas bubbles can cause oscillations of the tappet, which are audibly perceptible in the form of noise and cause a disadvantageous change in the operating behavior of the solenoid valve. In the known solenoid valves, there is in fact a first hydraulically effective connection between the armature chamber and the outlet via the guidance of the tappet in the valve insert, but this connection ends in a fashion similar to a blind hole so that no pressure flow can occur in the armature chamber.

Consequently, in solenoid valves according to the prior art, there is the risk that once the gas bubbles have collected in the armature chamber, they can only be removed from the valve cartridge of the solenoid valve with difficulty.

ADVANTAGES AND SUMMARY OF THE INVENTION

A solenoid valve according to the invention has the advantage over the prior art that an improvement in the armature chamber flow properties and thus in the removal of gas bubbles that may be present is achieved by means of design measures that are extremely easy to carry out. To accomplish this, in one proposal according to the invention, at least one second hydraulically effective connection of the armature chamber to the outlet, which is decoupled from the first hydraulically effective connection, is provided and is situated remote from the guide region for the tappet in the valve insert. Together with the above-described first hydraulic connection provided in the guide region for the tappet in the valve insert, this second hydraulically effective connection forms a closed flow path that extends from the inlet, through the valve element, via the guide region of the tappet in the armature chamber, and from the armature chamber, directly back to the outlet. It thus assures a flow through the armature chamber, making it relatively easy to rinse out gas bubbles that may be present. It is therefore possible to at least largely prevent the above-mentioned disadvantageous effects such as operating noise or a changed operating behavior of the solenoid valve.

The proposed second hydraulically effective connection can be implemented in a relatively simply designed and therefore inexpensive way by means of at least one longitudinal groove that is open toward the outside and extends from the outer circumference of the valve insert, along part of its axial length. The design of this longitudinal groove can be varied within wide latitudes with regard to its cross-sectional form (a cross-section in the form of a segment of a circle, a triangle, a rectangle, or a polygon) and/or with regard to its depth and can therefore be embodied in accordance with the valve and the function.

BRIEF DESCRIPTION OF THE DRAWING

An exemplary embodiment of the invention is shown in the drawings and will be explained in detail in the subsequent description.

FIG. 1 shows a solenoid valve according to the invention having a valve cartridge and an annular coil that can be slid onto the valve cartridge.

DESCRIPTION OF THE PREFERRED EMBODIMENT

The valve cartridge 100 shown in the FIGURE has a valve insert 10 as one of its central components. This valve insert is a hollow, cylindrical component that is manufactured out of magnetically conductive material, for example by machining a block of solid material in a material-removing way or by rolling a sheet metal blank. A tappet 12 is guided in an axially moving fashion inside the valve insert 10. For this purpose, at one of its ends, the tappet 12 has a first guide section 12.1 whose outer dimensions are matched to the inner diameter of the valve insert 10. The guide section 12.1 protrudes partially from the terminal end of the valve insert 10. In the direction pointing into the interior of the valve insert 10, the guide section 12.1 is adjoined by a closure-member section 12.2. The latter extends in the form of a finger to the end of the tappet 12 remote from the guide section 12.1. It has several reductions in its outer diameter and it ends at a ball segment 12.3. This ball segment 12.3 is situated inside the valve insert 10 and controls a valve seat 14.1.

The valve seat 14.1 is formed by a valve element 14. This valve element 14 is cup-shaped and is at least partially press-fitted into the open end of the valve insert 10. In the depicted starting position of the valve cartridge 100, the ball segment 12.3 of the tappet 12 is lifted away from the valve seat 14.1. This position is produced by a restoring element in the form of a spring 16. The spring 16 engages the tappet 12 at a transition embodied in the form of a right-angled shoulder 12.4, from the guide section 12.1 to the closure-member section 12.2 and at the opposite end, is supported against a support ring 18 likewise fixed in position inside the valve insert 10. The position of this support ring 18 inside the valve insert 10 can be changed in the direction of the longitudinal axis of this valve insert 10, making it possible to adjust the force of the spring 16 on the tappet 12 and the working stroke of the solenoid valve.

In the starting position depicted, approximately at the level of the position of the ball segment 12.3 of the tappet 12, a plurality of transverse bores 20 are embodied in the valve insert 10. These transverse bores 20 pass through the wall of the valve insert 10 on its outer circumference and are encompassed by an annular filter element 22. Together, the transverse bores 20 constitute an outlet from the valve cartridge 100. There is an axial distance between them and the support ring 18 of the spring 16, as a result of which, the spring 16 and support ring 18 are situated outside a flow of pressure fluid through the valve cartridge 100 that occurs when the valve seat is open and therefore do not influence the flow conditions.

The end surface 22.1 of the filter element 22 oriented toward the armature rests against a radial collar 24.1 of a capsule 24 that is anchored to the valve insert 10 in a pressure-fluid-tight fashion. For example, the capsule 24 is anchored to the valve insert 10 by means of a crimped connection 26. To permit the production of this crimped connection, the valve insert 10 has a horizontally extending annular groove 26.1 into which material of the wall of the capsule 24 has been displaced by means of a crimping procedure.

The capsule 24 has an open end encompassing the valve insert 10 and a dome-like, arched closed end remote from the valve insert 10. The valve insert 10 and the capsule 24 delimit a hollow armature chamber 28 in which a magnet armature 30 is accommodated in moving fashion. This magnet armature 30 rests against the end surface of the tappet 12 protruding from the valve insert 10 and provides for its actuation.

An inlet 32 of the valve cartridge 100 is situated at the end of the valve cartridge 100 remote from the armature 30. This inlet 32 is embodied in a socket piece 34 that is preferably manufactured out of plastic material by means of an injection molding technique. The socket piece 34 holds the filter element 22 in contact with the radial collar 24.1 of the capsule 24 and has a centrally situated, tower-shaped component 34.1 through which the inlet 32 passes. With this tower-shaped component 34.1, the socket piece 34 protrudes into the open end of the valve element 14 oriented away from the armature and by means of its wall, presses in a pressure-fluid-tight fashion against the inner diameter of this valve element 14. The tower-shaped component 34.1 protrudes so far that the inlet 32 feeds out almost immediately before the valve seat 14.1 in the flow direction.

To the side of the inlet, the socket piece 34 is also provided with a check valve 36. This check valve 36 controls a pressure fluid conduit 38, which extends from the outlet constituted by the transverse bores 20 to the inlet 32, and is embodied in the socket piece 34 itself. For this purpose, the check valve 36 has a valve-closure member in the form of a ball 36.1 that cooperates with a ball-shaped seat 36.2. The ball-shaped seat 36.2 and ball 36.1 are positioned relative to each other so that the pressure fluid conduit 38 is only opened if the pressure in the outlet is greater than the pressure in the inlet 32 of the valve cartridge 100.

Pressure fluid that flows in through the inlet 32, into the inside of the valve insert 10 when the tappet 12 is lifted away from the valve seat 14.1 can travel through the continuous axial grooves 18.1 on the support ring 18 and through axial grooves 12.5 on the tappet 12 into the armature chamber 28 and circulate around the armature 30 situated therein. Consequently, the valve cartridge 100 is completely filled with pressure fluid under operating conditions. The axial grooves 12.5 and 18.1 constitute a first hydraulically effective pressure fluid connection between the armature chamber 28 and the outlet of the valve cartridge 100 constituted by the transverse bores 20.

According to the invention, at least one second hydraulically effective pressure fluid connection is provided, which connects the armature chamber 28 to the outlet (transverse bores 20). This at least one second hydraulically effective pressure fluid connection is decoupled from the first hydraulic connection remote from the guide region of the tappet 12 and in fact is preferably situated between the outer circumference of the valve insert 10 and the inner circumference of the capsule 24. It is embodied in the form of a radially open longitudinal groove 40, which extends in the direction of the longitudinal axis of the valve insert 10 and extends from the end surface of this valve insert 10 oriented toward the armature to approximately the level of the transverse bores 20. This longitudinal groove 40 can be embodied on the inside of the capsule 24, on the outside of the valve insert 10, or on both components at the same time. The longitudinal groove 40 is covered over large areas by the capsule 24 and is therefore sealed in relation to the surroundings of the valve cartridge 100. Its cross-section can be embodied in the form of a segment of a circle, a rectangle, a triangle, or a polygon. The depth of the longitudinal groove 40 is greater than the depth of the annular groove 26.1 on the valve insert 10 forming the crimped connection 26 and therefore despite the presence of this crimped connection 26, produces a hydraulically effective passage between the armature chamber 28 and the outlet (transverse bores 20). The cross-sectional area of the longitudinal groove 40 can be dimensioned in accordance with the valve or the function. In order to minimize the negative impact on the magnetic properties of the solenoid valve, the invention proposes embodying this cross-sectional area to be as small as possible. In order to achieve its hydraulic effectiveness, however, it should not be smaller than a minimum size, which is approx. 0.2 mm$^2$ in the exemplary embodiment. The longitudinal groove 40 connects the armature chamber 28 immediately and directly to the outlet, in other words by the shortest path and without cutting into or crossing other pressure fluid carrying regions inside the valve cartridge 100.

The second pressure fluid connection constituted by the longitudinal groove 40, together with the above-explained first pressure fluid connection, produces a closed pressure fluid path from the inlet 32 through the valve seat 14.1 in the valve element 14, through the guide region of the tappet 12, into the armature chamber 28 and through this armature chamber 28, directly back to the outlet (transverse bores 20) and is thus hydraulically effective. As a result, a flow through the armature chamber 28 is produced, thus assuring a rinsing out of gas bubbles that may be present in the armature chamber.

The foregoing relates to the preferred exemplary embodiment of the invention, it being understood that other variants and embodiments thereof are possible within the spirit and scope of the invention, the latter being defined by the appended claims.

The invention claimed is:

1. A solenoid valve, comprising:
at least one inlet and at least one outlet;
a valve insert having a central bore;
a tappet that is configured to move axially within the central bore of the valve insert, the tappet including a guide region within the central bore that guides the axial movement of the tappet;
a valve element with a control cross-section, which is adjusted by axial movement of the tappet;
a capsule that is anchored to the valve insert and which defines an armature chamber;
an armature that is accommodated in the armature chamber and which is configured to actuate the tappet by moving axially in the armature chamber in response to a magnetic field generated around the armature;
a first hydraulically effective connection provided between the armature chamber and the at least one outlet, the first hydraulically effective connection being embodied in the guide region of the tappet; and
at least one second hydraulically effective connection of the armature chamber to the at least one outlet, the second hydraulically effective connection being embodied remote from the guide region of the tappet,
wherein the at least one second hydraulically effective connection is embodied between an outer circumference of the valve insert and an inner circumference of the capsule.

2. The solenoid valve as recited in claim 1, wherein the at least one second hydraulically effective connection includes at least one longitudinal groove that is open toward an outside of the capsule and extends in an axial direction of the valve insert.

3. The solenoid valve as recited in claim 2, wherein the longitudinal groove is embodied on at least one of the outer circumference of the valve insert and the inner circumference of the capsule.

4. The solenoid valve as recited in claim 3, wherein:
the valve insert includes at least one transverse bore that passes through a wall of the valve insert and defines the at least one outlet of the solenoid valve, and
the longitudinal groove extends axially from an end surface of the valve insert oriented toward the armature to a level of the least one transverse bore of the valve insert.

5. The solenoid valve as recited in claim 3, wherein the longitudinal groove has a cross section embodied as a segment of a circle, a rectangle, a triangle, or a polygon.

6. The solenoid valve as recited in claim 2, wherein:
the valve insert includes at least one transverse bore that passes through a wall of the valve insert and defines the at least one outlet of the solenoid valve, and
the longitudinal groove extends axially from an end surface of the valve insert oriented toward the armature to a level of the least one transverse bore of the valve insert.

7. The solenoid valve as recited in claim 6, wherein the longitudinal groove has a cross section embodied as a segment of a circle, a rectangle, a triangle, or a polygon.

8. The solenoid valve as recited in claim 2, wherein the longitudinal groove has a cross section embodied as a segment of a circle, a rectangle, a triangle, or a polygon.

9. The solenoid valve as recited in claim 8, wherein the longitudinal groove has a groove depth that is greater than a groove depth of an annular groove that is embodied on the valve insert and belongs to a pressure-tight crimped connection between the capsule and the valve insert.

10. The solenoid valve as recited in claim 2, wherein the longitudinal groove constitutes an immediate and direct connection between the armature chamber and the outlet.

11. The solenoid valve as recited in claim 1, wherein the solenoid valve is embodied as a continuous control valve that is open when without electrical current.

12. A solenoid valve, comprising:
at least one inlet and at least one outlet;
a valve insert equipped with a tappet that is guided in sliding fashion;
a valve element with a control cross-section that the tappet is able to control;
a capsule that is anchored to the valve insert and delimits an armature chamber;
an armature that is accommodated in moving fashion in the armature chamber and which actuates the tappet;
a first hydraulically effective connection provided between the armature chamber and the outlet, which is embodied in the valve insert in a guide region of the tappet; and
at least one second hydraulically effective connection of the armature chamber to the outlet is provided, which is embodied remote from the guide region of the tappet,
wherein the at least one second hydraulically effective connection includes at least one longitudinal groove that is open toward an outside of the capsule and extends in an axial direction of the valve insert, and
wherein the longitudinal groove has a groove depth that is greater than a groove depth of an annular groove that is embodied on the valve insert and belongs to a pressure-tight crimped connection between the capsule and the valve insert.

13. The solenoid valve as recited in claim 12, wherein the longitudinal groove constitutes an immediate and direct connection between the armature chamber and the outlet.

14. The solenoid valve as recited in claim 13, wherein the solenoid valve is embodied as a continuous control valve that is open when without electrical current.

15. A solenoid valve, comprising:
at least one valve inlet and at least one valve outlet;
a valve insert having a central bore;

a tappet that is configured to move axially within the central bore of the valve insert, the tappet including a guide region within the central bore that guides the axial movement of the tappet;

a valve element with a control cross-section, which is adjusted by axial movement of the tappet;

a capsule that is anchored to the valve insert and which defines an armature chamber;

an armature that is accommodated in the armature chamber and which is configured to actuate the tappet by moving axially in the armature chamber in response to a magnetic field generated around the armature;

a first hydraulically effective connection provided between the armature chamber and the at least one valve outlet, the first hydraulically effective connection being embodied in the guide region of the tappet; and at least one second hydraulically effective connection of the armature chamber to the at least one valve outlet, the second hydraulically effective connection being embodied remote from the guide region of the tappet, wherein the first hydraulically effective connection receives fluid from a first fluid inlet and discharges the fluid from a first fluid outlet into the armature chamber, and the at least one second hydraulically effective connection receives the fluid from the armature chamber through a second fluid inlet and discharges the fluid to the at least one valve outlet from a second fluid outlet such that a hydraulic flow path is established from the first fluid inlet to the first fluid outlet through the armature chamber to the second fluid inlet and out of the second fluid outlet.

16. The solenoid valve as recited in claim 15, wherein the at least one second hydraulically effective connection is embodied between an outer circumference of the valve insert and an inner circumference of the capsule.

17. The solenoid valve as recited in claim 16, wherein the at least one second hydraulically effective connection includes at least one longitudinal groove that is open toward an outside of the capsule and extends in an axial direction of the valve insert.

18. The solenoid valve as recited in claim 17, wherein the longitudinal groove is embodied on at least one of an outer circumference of the valve insert and an inner circumference of the capsule.

19. The solenoid valve as recited in claim 18, wherein the longitudinal groove extends from an end surface of the valve insert oriented toward the armature to a level of at least one transverse bore that passes through a wall of the valve insert and constitutes the outlet of the solenoid valve.

20. The solenoid valve as recited in claim 17, wherein:

the valve insert includes at least one transverse bore that passes through a wall of the valve insert and defines the at least one outlet of the solenoid valve, and the longitudinal groove extends axially from an end surface of the valve insert oriented toward the armature to a level of the least one transverse bore of the valve insert.

* * * * *